Jan. 9, 1940. H. FROMM 2,186,672
JUICE EXTRACTOR
Filed Sept. 9, 1938 2 Sheets-Sheet 1
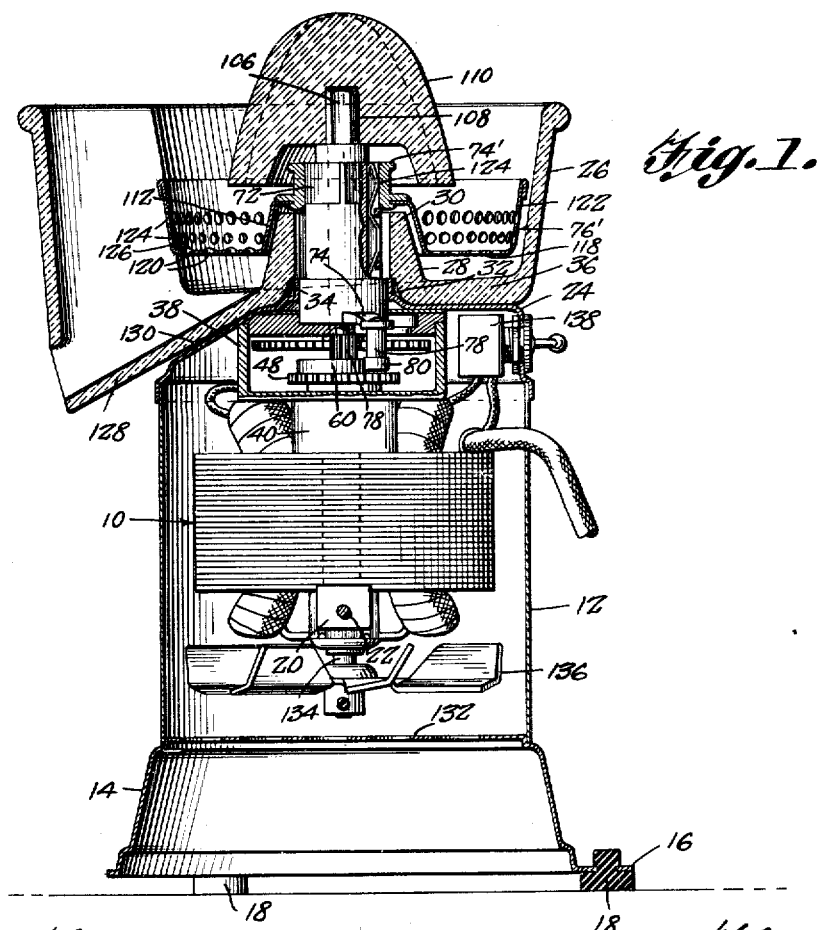
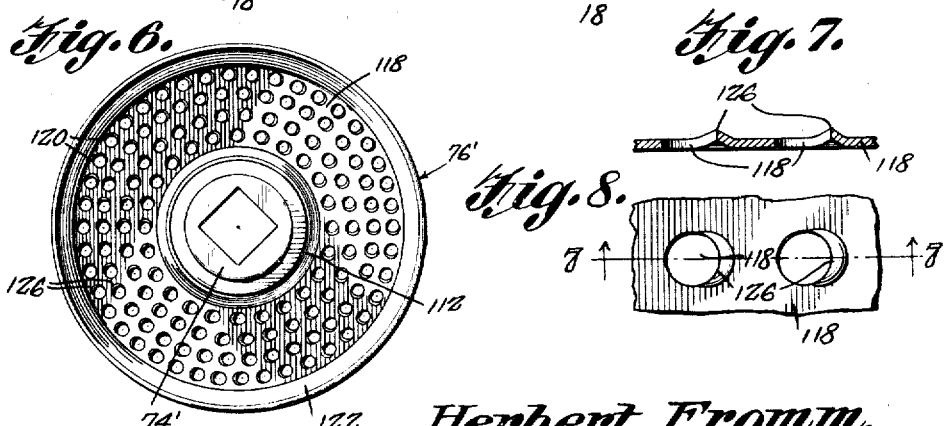
Herbert Fromm, INVENTOR Jan. 9, 1940.  H. FROMM  2,186,672
JUICE EXTRACTOR
Filed Sept. 9, 1938  2 Sheets-Sheet 2
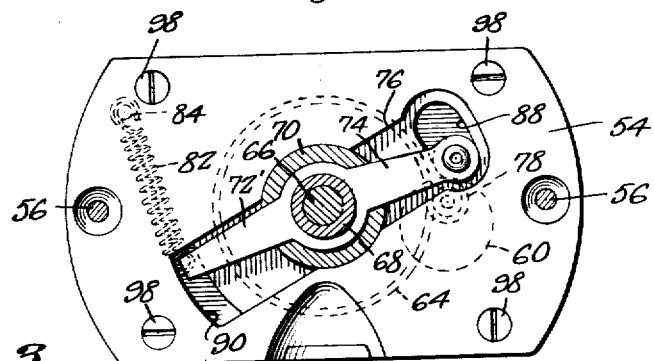
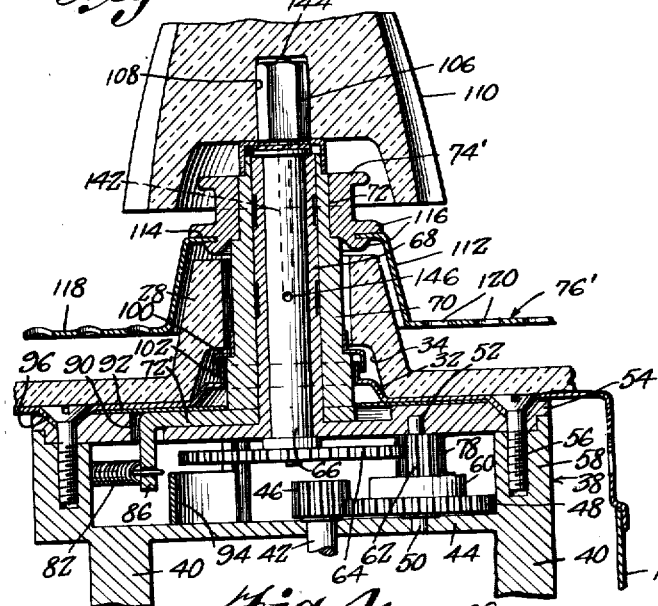
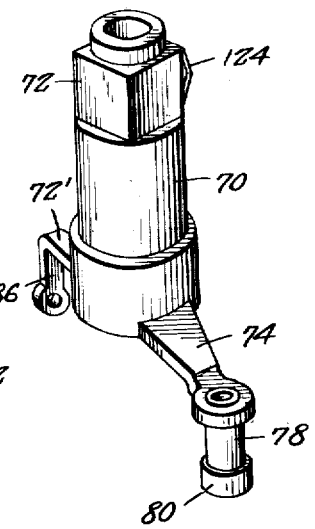
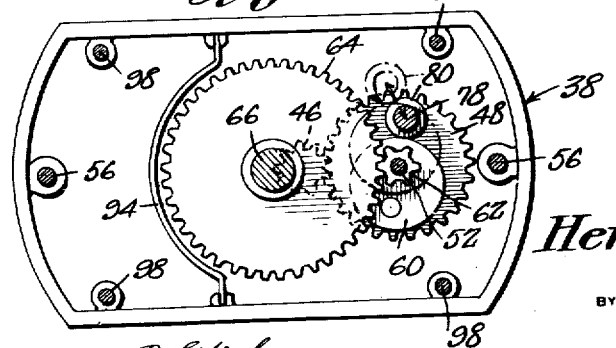
Herbert Fromm,
INVENTOR Patented Jan. 9, 1940

2,186,672

UNITED STATES PATENT OFFICE 2,186,672

JUICE EXTRACTOR

Herbert Fromm, Hamburg, Wis.

Application September 9, 1938, Serial No. 229,197

7 Claims. (Cl. 146—3)

My invention relates to the extraction of fruit juices and includes among its objects and advantages the provision of an improved fruit juice extractor.

An object of my invention is to provide a fruit juice extractor of the power operated type employing a reamer and an oscillating strainer operable about the axis of the reamer in which a novel operating connection is provided between the source of power and the strainer. My invention makes use of an electric motor and a train of gears connecting the motor with the reamer. Within the gear train I interpose novel means operatively connected with the strainer for oscillating the same about the axis of rotation of the reamer. In addition, the present invention embodies a novel strainer designed to break fruit cells and solids in such manner as to completely extract the fruit juices therefrom. The extractor is so designed as to embody an exceedingly compact unit, in addition to comprising relatively few parts so designed as to permit the units to be manufactured at a relatively low cost. The present invention is designed with a view to kitchen use in the average home and embodies a relatively durable unit of convenient weight and ornamental design.

In the accompanying drawings:

Figure 1 is a vertical sectional view of a fruit juice extractor embodying my invention;

Figure 2 is a top plan view of the oscillating mechanism for the strainer;

Figure 3 is enlarged sectional detail view of the operating mechanism for the strainer and the reamer;

Figure 4 is a plan view of the gear mechanism;

Figure 5 is a perspective view of the oscillating mechanism for the strainer;

Figure 6 is a top plan view of the strainer;

Fig. 7 is a sectional view along the line 7—7 of Figure 8; and

Figure 8 is an enlarged plan view of a portion of the strainer.

In the embodiment selected to illustrate my invention, I make use of an electric motor 10 enclosed within a housing 12 mounted on a base 14. Base 14 includes ears 16 to which I attach resilient pads 18 to prevent marring of table tops and the like. Motor 10 is anchored in the housing 12 through the medium of a bracket 20 which may be attached to the housing at different points through the medium of screws 22. On the upper end of the housing 12 I mount a cap 24 which carries a bowl 26, which bowl includes an upstanding neck 28 having a bore 30. Cap 24 is provided with a flange 32 which fits inside the annular recess 34 in the bottom 36 and neck part 28 of the bowl to restrain lateral shifting of the bowl.

Motor 10 supports a gear box 38 through the medium of legs 40. In Figure 3, I illustrate the drive shaft 42 of the motor as extending through the floor 44 of the gear box and provided with a pinion 46 arranged in mesh with a larger gear 48. Gear 48 includes a shaft 50 journaled in the floor 44 and a shaft 52 journaled in the cover 54 of the gear box. Cover 54 is made secure by screws 56 extending through the cover and threaded into the end wall 58 of the gear box.

A cam 60 and a pinion 62 are formed integrally with the gear 48, while the gear 62 is arranged in mesh with a gear 64 connected with the reamer shaft 66. Reamer shaft 66 is rotatably supported within an upstanding sleeve 68 formed integrally with the cover 54. Upon the sleeve 68, I rotatably mount a strainer sleeve 70 to the lower end of which are connected laterally extending arms 72 and 74. These arms lie within a recess 76 in the cover plate 54. Strainer sleeve 70 is circular in cross section with the exception of the reach 72, which is square as illustrated in Figure 5.

Upon the square reach 72 I press the hub 74 of the strainer 76. Hub 74 includes a square opening for connection with the reach 72, so that the strainer 76 will be oscillated with the sleeve 70 as a unit.

Oscillation of the sleeve 70 is accomplished through the medium of arms 72 and 74. Arm 74 carries a downwardly extending shaft or pin 78 upon which I mount a bearing sleeve 80 held in pressure relation with the periphery of the cam 60 through the medium of a spring 82. One end of the spring 82 is attached to the arm 72 and the other end of the spring is anchored to the cover plate 54 as at 84. Referring to Figures 2 and 4, it will be noted that the cam 60 is eccentrically located with respect to the axis of the pinion 62 so that rotation of the pinion brings about rotation of the cam 60 for oscillating the arm 74. Such oscillatory movement of the arm 74 is transmitted to the strainer 76 through the medium of the sleeve 70. Figure 3 illustrates the arm 72 as having a downwardly projecting finger 86 to which the spring 82 is connected. I slot the cover plate 54 at 88 for accommodating the sleeved pin 78 and provide a slot 90 for accommodating the finger 86.

A cover plate 92 is positioned between the cap 24 and the cover plate 54. Plate 92 extends across the recess 90 for enclosing the arms 72 and 74 to prevent the escape of oil from the gear box 38. The box may be provided with a supply of hard oil at the time of assembly as a source of permanent lubricant for the gears in the box. A curved wall 94 extends transversely of the gear box 38 to confine the spring 82 in a separate compartment. Should the spring 82 break, the pieces of the spring are restrained from entering in and about the gear train, thus affording protection for the gears. Cap 24 is made secure by the screws 56 as at 96 in Figure 3. Screws 98 additionally secure the cover 54 in place. In Figure 3 I illustrate a cap 100 as being pressed on the sleeve 70 and arranged to extend about the flange 102 formed on the neck 32. Cap 100 acts as a guard against the entrance of moisture between the cap 24 and the sleeve 70.

To the upper end of the reamer shaft 66, I connect a reamer key 106 shaped to be inserted in a correspondingly shaped socket 108 in the reamer bulb 110. Strainer 76 includes a conically shaped formation 112 having a flange 114 pinched between the flanges 116 of the strainer hub 74. The bottom 118 of the strainer 76 is perforated as at 120 while the peripheral margin of the strainer is bent upwardly to provide a flange 122. Flange 122 is provided with perforations 124 through which fruit juices may drain into the bowl 26. Fruit juices will, of course, additionally drain through the perforations 120.

While the hub 74 of the strainer is detachably connected with the reach 72, I slot the sleeve 70 for the reception of the spring 124 which is shaped to bear against the hub 74 in the manner of Figure 1. Spring 124 prevents rattling of the strainer during reciprocation thereof. Reamer 110 is detachably connected with the element 106.

In Figures 7 and 8, I illustrate the manner in which the bottom 118 of the strainer is shaped. Adjacent each of the perforations 120 I strike up the bottom 118 to provide sharp formation 126 which function to break the fruit cells and reduce the fruit pulp to such a degree as to remove all the fruit juices therefrom. The strainer is reciprocated at a rapid rate so that the sharp formation 126 will effectively reduce all the solids. Fruit juices drained from the strainer 76 are delivered to the bowl 26, which bowl is shaped to provide a drain spout 128 projecting laterally of the motor housing 12. Cap 24 is depressed at 130 to provide accommodation for the spout 128.

Reamer 110, the strainer 76 and the bowl 26 are each detachably related so that these parts may be removed for cleaning purposes.

Base 14 includes a perforated top 132 for the inlet of air. Motor 10 includes a downwardly extending power shaft 134 to which I connect a fan 136. The fan moves air upwardly through the motor housing 12, while the cap 24 is provided with openings 138 for the outlet of air. A conventional switch 140 may be mounted on the cap 24 for connection with the motor circuit.

Because of the sharp formations 126, oscillation of the strainer 76 causes the fruit pulp to advance in the same general direction about the axis of the strainer. The formations 126 are sharp so as to effectively strike the fruit pulp for breaking the solids in addition to advancing the mass along the bottom of the strainer. Such advancement of the fruit pulp imparts an agitating action thereto so as to effectively bring all the solids into breaking relation with the formations 126. Agitation of the fruit pulp together with the advancement thereof facilitates drainage of the fruit juices into the bowl.

Reamer shaft 66 is provided with a longitudinal lubricating bore 142 closed at its upper end by a conventional spring pressed ball 144. A transverse bore 146 communicates with the bore 142 for delivering lubricant to the surface of the shaft.

Without further elaboration, the foregoing will so fully illustrate my invention that others may, by applying current knowledge, readily adapt the same for use under various conditions of service.

I claim:

1. A fruit juice extractor comprising a motor driven gear, a support having an upstanding sleeve, a rotative shaft extending through said upstanding sleeve and having a reamer mount at its upper end, a train of gears operatively connecting the motor driven gear with said rotative shaft, a second sleeve mounted for oscillation on said upstanding sleeve, a strainer carried by said second sleeve for oscillation therewith below the reamer, arms connected with said second sleeve, a cam actuated by one gear in said train of gears and operatively engaging one of said arms for oscillating said second sleeve, and resilient means cooperating with the other of said arms for biasing the said one of said arms against the cam.

2. A fruit juice extractor comprising a motor driven gear, a support having an upstanding sleeve, a rotative shaft extending through said upstanding sleeve and having a reamer mount at its upper end, a train of gears operatively connecting the motor driven gear with said rotative shaft, a second sleeve mounted for oscillation on said upstanding sleeve, a strainer carried by said second sleeve for oscillation therewith below the reamer, said support comprising a relatively fixed horizontal plate having slots, arms connected with said second sleeve, one of said arms having an element extending through said arms having an element extending through one of the slots in the plate, a cam actuated by one gear in said train of gears and operatively engaging said element for oscillating said second sleeve, the other of said arms having a finger extending through the other of said slots, and resilient means cooperating with said finger for biasing said element against the cam.

3. A fruit juice extractor comprising a housing provided with a motor, a relatively fixed, upstanding sleeve, a rotative shaft extending through said upstanding sleeve and having a reamer mount at its upper end, a train of gears operatively connecting the motor with said rotative shaft, a second sleeve mounted for oscillation on said upstanding sleeve, a strainer carried by said second sleeve for oscillation therewith below the reamer, an operating connection between one gear in said train of gears and said second sleeve for oscillating the latter, a cap for said housing including an upstanding flange embracing said second sleeve, a bowl having a bottom arranged to rest on said cap with the bottom of the bowl provided with an upstanding neck surrounding said second sleeve, a sealing flange carried by said second sleeve inside said neck and partly overlying said flange to deflect fruit juices from said second sleeve, and a conically shaped formation in said strainer extending about said neck to deflect fruit juices from the upper margin of the neck and said second sleeve.

4. A fruit juice extractor comprising a motor, a housing for the motor, a gear box mounted on the motor and including a detachable cover plate, an upstanding sleeve carried by said cover plate, a rotative shaft extending through said upstanding sleeve and having a reamer mount at its upper end, a train of gears operatively connecting the motor with said rotative shaft, a second sleeve mounted for oscillation on said upstanding sleeve, a strainer having a hub connected with said second sleeve for rotating the strainer therewith below the reamer, said cover plate being slotted, arms connected with said second sleeve and lying on said cover plate, one of said arms having an element extending through one slot in the cover plate, a cam actuated by one gear in said train of gears and operatively engaging said element for oscillating the sleeve, the other of said arms having a finger extending through another slot in the cover plate, resilient means effective on said finger for biasing said element against the cam, a cap for said housing lying on said cover plate and including a flange embracing the lower margin of said second sleeve, and a flange carried by said second sleeve overlying said first flange for deflecting fruit juices from said lower margin of the second sleeve to seal the slots in said cover plate.

5. A fruit juice extractor comprising a motor, a housing for the motor, a gear box mounted on the motor and including a detachable cover plate, an upstanding sleeve carried by said cover plate, a rotative shaft extending through said upstanding sleeve and having a reamer mount at its upper end, a train of gears operatively connecting the motor with said rotative shaft, a second sleeve mounted for oscillation on said upstanding sleeve, a strainer having a hub connected with said second sleeve for rotating the strainer therewith below the reamer, said cover plate being slotted, arms connected with said second sleeve and lying on said cover plate, one of said arms having an element extending through one slot in the cover plate, a cam actuated by one gear in said train of gears and operatively engaging said element for oscillating the sleeve, the other of said arms having a finger extending through another slot in the cover plate, resilient means effective on said finger for biasing said element against the cam, a cap for said housing lying on said cover plate and including a flange embracing the lower margin of said second sleeve, a flange carried by said second sleeve overlying said first flange for deflecting fruit juices from said lower margin of the second sleeve to seal the slots in said cover plate, a bowl resting on said cap and having a conically shaped neck encircling said second sleeve above the flange on the latter, and a conically shaped formation in the strainer fixedly connected with said hub and encircling the upper margin of said conically shaped neck to deflect fruit juices from the upper end of the neck.

6. A fruit juice extractor comprising a motor, a housing for the motor, a gear box mounted on the motor and including a detachable cover plate, an upstanding sleeve carried by said cover plate, a rotative shaft extending through said upstanding sleeve and having a reamer mount at its upper end, a train of gears operatively connecting the motor with said rotative shaft, a second sleeve mounted for oscillation on said upstanding sleeve, a strainer having a hub connected with said second sleeve for rotating the strainer therewith below the reamer, said cover plate being slotted, arms connected with said second sleeve and lying on said cover plate, one of said arms having an element extending through one slot in the cover plate, a cam actuated by one gear in said train of gears and operatively engaging said element for oscillating the sleeve, the other of said arms having a finger extending through another slot in the cover plate, resilient means effective on said finger for biasing said element against the cam, a cap for said housing lying on said cover plate and including a flange embracing the lower margin of said second sleeve, a flange carried by said second sleeve overlying said first flange for deflecting fruit juices from said lower margin of the second sleeve to seal the slots in said cover plate, a bowl resting on said cap and having a conically shaped neck encircling said second sleeve above the flange on the latter, and a conically shaped formation in the strainer fixedly connected with said hub and encircling the upper margin of said conically shaped neck to deflect fruit juices from the upper end of the neck, said conically shaped formation in the strainer having an annular flange pinched between flanges on said hub to provide a liquid-tight connection.

7. A fruit juice extractor comprising a motor, a housing for the motor, a gear box mounted on the motor and including a detachable cover plate, an upstanding sleeve carried by said cover plate, a rotative shaft extending through said upstanding sleeve and having a reamer mount at its upper end, a train of gears operatively connecting the motor with said rotative shaft, a second sleeve mounted for oscillation on said upstanding sleeve, a strainer having a hub connected with said second sleeve for rotating the strainer therewith below the reamer, said cover plate being slotted, arms connected with said second sleeve and lying on said cover plate, one of said arms having an element extending through one slot in the cover plate, a cam actuated by one gear in said train of gears and operatively engaging said element for oscillating the sleeve, the other of said arms having a finger extending through another slot in the cover plate, resilient means effective on said finger for biasing said element against the cam, a cap for said housing lying on said cover plate and including a flange embracing the lower margin of said second sleeve, a flange carried by said second sleeve overlying said first flange for deflecting fruit juices from said lower margin of the second sleeve to seal the slots in said cover plate, said cover plate being recessed to house said arms, a closure plate lying on said cover plate and extending across the recess in the cover plate, and means for fixedly connecting the cap and said closure plate with said gear box.

HERBERT FROMM.